United States Patent
Ebner et al.

(10) Patent No.: US 7,400,894 B2
(45) Date of Patent: Jul. 15, 2008

(54) METHOD FOR DECENTRALIZED SYNCHRONIZATION IN A SELF-ORGANIZING RADIO COMMUNICATION SYSTEM

(75) Inventors: Andre Ebner, Ingolstadt (DE); Rüdiger Halfmann, Otterberg (DE); Hui Li, Beijing (CN); Matthias Lott, Neuried (DE); Hermann Rohling, Wolfenbüttel (DE); Egon Schulz, München (DE)

(73) Assignee: Siemens Aktiengesellschaft, Munich (DE)

( * ) Notice: Subject to any disclaimer, the term of this patent is extended or adjusted under 35 U.S.C. 154(b) by 295 days.

(21) Appl. No.: 10/532,989

(22) PCT Filed: Oct. 28, 2003

(86) PCT No.: PCT/EP03/11962

§ 371 (c)(1),
(2), (4) Date: Apr. 28, 2005

(87) PCT Pub. No.: WO2004/038959

PCT Pub. Date: May 6, 2004

(65) Prior Publication Data
US 2006/0030343 A1    Feb. 9, 2006

(30) Foreign Application Priority Data
Oct. 28, 2002    (EP)    .................. 02257475

(51) Int. Cl.
  *H04B 7/005* (2006.01)
(52) U.S. Cl. .................... 455/502; 455/11.1; 455/517; 370/338
(58) Field of Classification Search ............... 455/502, 455/41.2, 41.3, 11.1, 517; 370/338
See application file for complete search history.

(56) References Cited

U.S. PATENT DOCUMENTS

| 5,506,587 | A | 4/1996 | Lans ..................... 342/357.09 |
| 5,682,383 | A | 10/1997 | Dahod et al. ................ 370/364 |
| 6,785,510 | B2 * | 8/2004 | Larsen ...................... 455/11.1 |
| 7,190,961 | B2 * | 3/2007 | Burr ........................... 455/502 |
| 2004/0023678 | A1 * | 2/2004 | Fredriksson ................ 455/502 |

FOREIGN PATENT DOCUMENTS

| WO | WO93/01576 | 1/1993 |
| WO | WO01/99330 A1 | 12/2001 |
| WO | WO02/065669 A2 | 8/2002 |

* cited by examiner

*Primary Examiner*—Philip J Sobutka
(74) *Attorney, Agent, or Firm*—Staas & Halsey LLP

(57) ABSTRACT

A method performs synchronization in an at least partly self-organizing radio communication system with a number of mobile stations which lie across an air interface within two-way radio range. At least some mobile stations from the number of mobile stations transmit synchronization sequences, by which a part or all the mobile stations of the number of mobile stations synchronize.

21 Claims, 4 Drawing Sheets

METHOD FOR DECENTRALIZED SYNCHRONIZATION IN A SELF-ORGANIZING RADIO COMMUNICATION SYSTEM

CROSS REFERENCE TO RELATED APPLICATIONS

This application is based on and hereby claims priority to PCT Application No. PCT/EP2003/011962 filed on Oct. 28, 2003 and European Application No. 02257475.0 filed on Oct. 28, 2002, the contents of which are hereby incorporated by reference.

BACKGROUND OF THE INVENTION

The invention relates to a method for synchronization in a radio communication system having a plurality of mobile stations, the radio communication system being at least partly self-organizing.

The invention also relates to a mobile station in a radio communication system, the radio communication system being at least partly self-organizing, and to a radio communication system.

Communication systems are extremely important in the field of business as well as in private use. Significant efforts are being made to link cable-based communication systems to radio communication systems. The resulting hybrid systems lead to an increase in the number of available services as well as allowing greater flexibility in terms of communication. Devices that can use different systems (multi-homing) are therefore being developed.

In this context, great importance is attached to radio communication systems due to the mobility they offer to the subscribers.

In radio communication systems, information (e.g. voice, image information, video information, SMS [Short Message Service] or other data) is transmitted between a sending station and a receiving station (base station or subscriber station) via a radio interface using electromagnetic waves. In this case, the emission of the electromagnetic waves takes place using carrier frequencies that lie in the frequency band which is designated for the system concerned.

In the case of the established GSM (Global System for Mobile Communication) mobile radio system, frequencies at 900, 1800 and 1900 MHz are used. These systems principally transfer voice, facsimile and SMS short messages (Short Message Service) as well as digital data.

For future mobile radio systems that use CDMA or TD/CDMA transmission methods, e.g. UMTS (Universal Mobile Telecommunication System) or other third-generation systems, frequencies in the frequency band of approx. 2000 MHz are planned. These third-generation systems are being developed to meet the aims of worldwide radio coverage, a broad offering of data transmission services and, most importantly, flexible management of the capacity of the radio interface, which is the interface with the fewest resources in the case of radio communication systems. In the context of these radio communication systems, the flexible management of the radio interface should primarily allow a subscriber station to send and/or receive a large volume of data at high data speeds as required.

The access of stations to the shared radio resources of the transmission medium, e.g. time, frequency, throughput or space, is governed by multiple access (MA) methods in these radio communication systems.

In the case of time division multiple access methods (TDMA), each send and receive frequency band is divided into time slots, wherein one or more cyclically repeated time slots are allocated to the stations. Using TDMA, the radio resource of time is separated in a station-specific manner.

In the case of frequency division multiple access methods (FDMA), the complete frequency domain is divided into narrow-band domains, wherein one or more narrow-band frequency domains are allocated to the stations. Using FDMA, the radio resource of frequency is separated in a station-specific manner.

In the case of code division multiple access (CDMA) methods, the throughput/information which has to be transmitted is encoded in a station-specific manner by a spreading code which is formed of a multiplicity of individual so-called chips, whereby the throughput which must be transmitted is spread randomly over a wide frequency domain in accordance with a code. The spreading codes which are used by different stations within a cell/base station are mutually orthogonal or essentially orthogonal in each case, whereby a receiver recognizes the signal throughput which is intended for the receiver and suppresses other signals. Using CDMA, the radio resource of throughput is separated in a station-specific manner by spreading codes.

In the case of orthogonal frequency multiple access methods (OFDM), the data is transferred in a broadband manner, wherein the frequency band is divided into equidistant orthogonal subcarriers, such that the simultaneous phase shifting of the subcarriers covers a two-dimensional data flow in the time-frequency domain. Using OFDM, the radio resource of frequency is separated in a station-specific manner by orthogonal subcarriers. The combined data symbols which are transferred on the orthogonal subcarriers during a time unit are called OFDM symbols.

The multiple access methods can be combined. Many radio communication systems therefore use a combination of the TDMA and FDMA methods, wherein each narrow-band frequency band is divided into time slots.

For the purpose of the aforementioned UMTS mobile radio system, a distinction is made between a so-called FDD (frequency division duplex) mode and a TDD (time division duplex) mode. In particular, the TDD mode is characterized in that a shared frequency band is used for the signal transmission in both uplink (UL) direction and in downlink (DL) direction, while the FDD mode uses a different frequency band for the two transmission directions in each case.

In radio communication connections of the second and/or third generation, information can be transmitted in a circuit-switched (CS) or packet-switched (PS) manner.

The connection between the individual stations takes place via a radio communication interface (air interface). Base station and radio network controller are usually components of a base station subsystem (RNS radio network subsystem). A cellular radio communication system normally includes a plurality of base station subsystems which are connected to a core network (CN). In this case, the radio network controller of the base station subsystem is usually connected to an access facility of the core network.

In addition to these hierarchically organized cellular radio communication systems, self-organizing wireless radio communication systems—e.g. so-called ad-hoc systems—are becoming increasingly important, this applying also in the context of cellular radio communication systems.

Self-organizing radio communication systems generally also allow the direct communication between mobile terminals, and need not have a central entity which controls the access to the transmission medium.

Self-organizing radio communication systems make it possible for data packets to be exchanged directly between moving radio stations without the involvement of base stations. Consequently, an infrastructure in the form of base stations within a cellular structure is not required in such a radio network. Instead, data packets can be exchanged between moving radio stations which are within radio range of each other. In order to allow the exchange of data packets in principle, a synchronization is required between the radio stations which are usually moving. In the case of a wireless transmission via electronic waves, this means e.g. the balancing of carrier frequency (frequency synchronization) and time slot pattern (time synchronization).

Various solutions are conceivable for the synchronization in mobile radio data networks. For example, the mobile stations can have a shared reference which is transmitted e.g. via GPS. The system therefore includes globally known time information which all mobile stations can follow (e.g. VDL Mode 4, or WO 93/01576, "A Position Indicating System"). This method is disadvantageous firstly because all mobile stations must have a cost-intensive GPS receiver. Secondly, the reception of GPS signals e.g. in buildings is not always guaranteed. Other systems such as TETRA, for example, support the selection of a master which assumes the function of a 'clock signal generator' for the frequency domain that is assigned to it. However, such methods preclude a high granularity in relation to the time (TDMA) and/or the code (CDMA). An FDMA component is preferably used for separating the subscribers in this case. A third group of systems, such as e.g. IEEE802.11, operate without a shared time slot pattern. The mobile stations synchronize themselves by a one-shot synchronization on the basis of the data burst which is received in each case. Reservation of resources in the form of time slots for ensuring the QoS is no longer possible in this case, however.

SUMMARY OF THE INVENTION

The inventors propose a method, a mobile station and a radio communication system of the type cited at the beginning, which allow time-relative synchronization between moving radio stations for a self-organizing radio data network, without the presence of a cellular infrastructure being necessary in order to achieve this. The synchronization should not be dependent on GPS and should be decentrally organizable. It should nonetheless be possible to support a frame structure in a network topology which varies significantly over time, since synchronization should be possible in the case of highly mobile subscribers in particular, i.e. where there is significant fluctuation in the network topology (e.g. in the case of mobile stations in moving vehicles, cf. FIG. 1). In a further step, consideration should also be given to the merging of asynchronously active clusters with regard to synchronization, wherein mobile stations that are situated within a reciprocal radio range are designated as clusters.

At least some mobile stations from the number of mobile stations will transmit synchronization sequences, with reference to which some or all of the mobile stations from the number of mobile stations will synchronize themselves.

As a result of the independence of the synchronization from the cellular infrastructure, and in particular from base stations, the synchronization takes place decentrally. The subscriber stations can be but do not have to be mobile. These subscriber stations are designated as mobile stations hereinafter.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
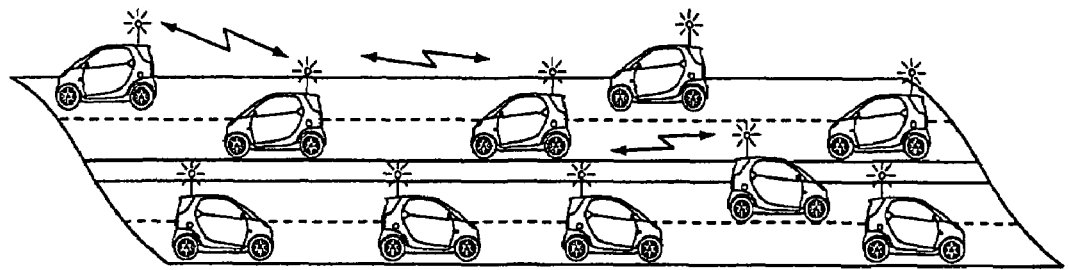
FIG. 1: shows a network structure of a mobile self-organizing radio data network.

Reference will now be made in detail to the preferred embodiments of the present invention, examples of which are illustrated in the accompanying drawings, wherein like reference numerals refer to like elements throughout.

The invention is particularly suitable for TDD/TDMA-based technologies—as are currently being discussed for the next generation of mobile communications. The method can be used advantageously in a variant of the (current) 3rd generation of mobile communications, for example, since the decentrally organized synchronization for highly mobile radio data networks can be implemented for the Low Chip Rate (LCR) variant of UTRA TDD. It is easy to implement ported versions of the algorithms on TSM or HCR. In addition, the application can also be used on other time-slot-oriented access systems, e.g. DECT In self-organizing radio networks having centrally organized synchronization, a mobile station assumes—within a cluster—the function of the clock signal generator. This role can be established at the beginning of the network construction. However, it can also be of limited time duration. Protocol mechanisms which organize the selection of the corresponding mobile stations are known (cf. e.g. HIPERLAN2).

In the case of decentrally organized synchronization, the function of the clock signal generator is not assumed by a single mobile station but by a subset of all participating mobile stations. In the extreme case, it is even possible to use all mobile stations for maintaining the synchronization.

These mobile stations also transmit synchronization sequences in addition to the actual payload data. The synchronization sequences can be part of an information-carrying data packet in this case. However, they can also be supplied to the radio network separately by a synchronization channel which is dedicated, i.e. separate from the transmission of payload data, the synchronization channel being defined on the basis of frequency, time and/or code multiplexing.

Synchronizing mobile stations detect the synchronization positions $T_{SYNC,i}$ of the other mobile stations and derive their own synchronization position from these. The quality of the individual detected synchronization positions—which can be derived e.g. from their received signal strength—can be taken into consideration in this case, as can the preceding synchronization position of the synchronizing mobile station.

The following relationship can be established for the time-based synchronization position $T_{SYNC}$:

$$T_{SYNC} = \alpha \cdot T_{SYNC,old} + \frac{1-\alpha}{\sum_i g_i} \sum_i g_i \cdot T_{SYNC,i}; 0 \leq \alpha \leq 1$$

In this case, a is a weighting factor for the preceding synchronization position $T_{SYNCold}$ of the synchronizing mobile station. Different strategies exist for the weighting $g_i$ of the currently detected synchronization positions of the other mobiles i. Two are listed below as examples:

1.) detection of the maximum $g_i = \begin{cases} 1 & \text{for max. recv. level} \\ 0 & \text{otherwise} \end{cases}$ 2.) weighting using the receive level.

It is clear that the consideration of the preceding synchronization time points is particularly important for the convergence of the decentral synchronization, and is therefore preferably used in combination with synchronization positions of the other mobiles for the specification. The estimated value can be 'continuously' improved in this way.

Since the synchronization time point of a mobile station is generally derived from a plurality of references, wherein the signal propagation times can vary significantly due to the different distances between the individual mobiles, the variance of the synchronization position is possibly greater in comparison with synchronization in a centrally organized network (e.g. with a base station). This can be taken into consideration when dimensioning the corresponding guard periods. In the case of a range of 1 km, for example, an additional tolerance of up to 3 μs is generated by the differences in propagation times alone, and has to be compensated.

A plurality of embodiments are described below:

A. The transmission of the synchronization data can take place in the same burst which carries the data. The position (e.g. as pre-amble or mid-amble) of the synchronization data which relates to the actual data sequence is irrelevant in this case.

B. The method is not based on a joint transmission of synchronization data and the actual data sequence. The synchronization data can optionally also be transmitted via a further burst, which is separated from the actual data burst by a CDMA, TDMA or even an FDMA component. It is critical solely that the relative position of these bursts to the actual data burst must be established unambiguously.

C. The cyclical (not necessarily periodic) transmission of the synchronization sequence is significant for maintenance of the synchronization. One, a plurality or even all mobiles must ensure that this 'service' of the air interface is available. This applies in particular if none of the participating mobiles transmits payload data. The cyclical transmission of a burst—also referred to subsequently as a beacon—which inter alia also carries the synchronization string is extremely advantageous both for the decentral synchronization in accordance with the method which is described here and for the organization of the self-organizing network, e.g. for identifying the neighbors who are situated within the radio range and for updating the 'neighbor list'.

D. Each mobile station derives its own reference clock from the synchronization signals of the mobile stations which are situated within their synchronization range. The quality of these references can vary significantly. While one of the mobile stations also uses a GPS signal as a reference, another can receive its reference clock exclusively from the received signals of the other mobile stations. In order to improve the synchronization, a degree for the quality of the reference can be specified in the beacon, for example, the degree then being taken into consideration by a corresponding weighting when the optimal sampling instant is calculated.

E. In the case of access methods which combine a plurality of time slots in a frame, or even combine a plurality of frames in so-called superframes, it is necessary to define mechanisms which support frame synchronization. It is appropriate here to mark the relevant time slots, so that the position in the relevant frame can be inferred from the marking.

Figure 2:
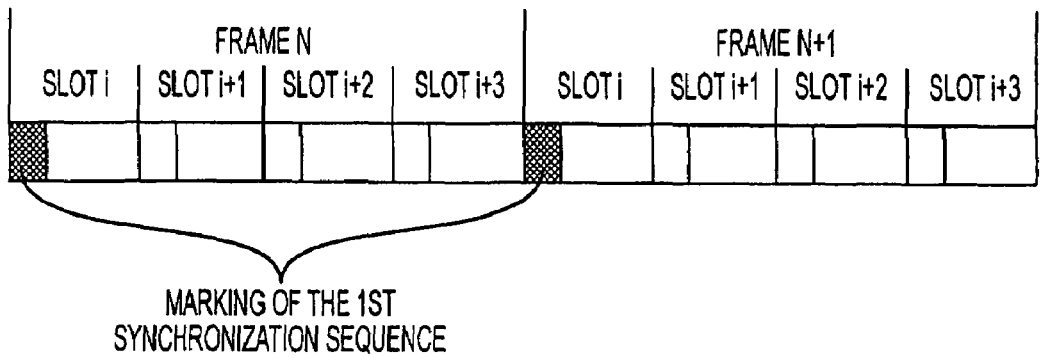
FIG. 2: shows a first example for marking the synchronization sequence for frame synchronization.
Figure 3:
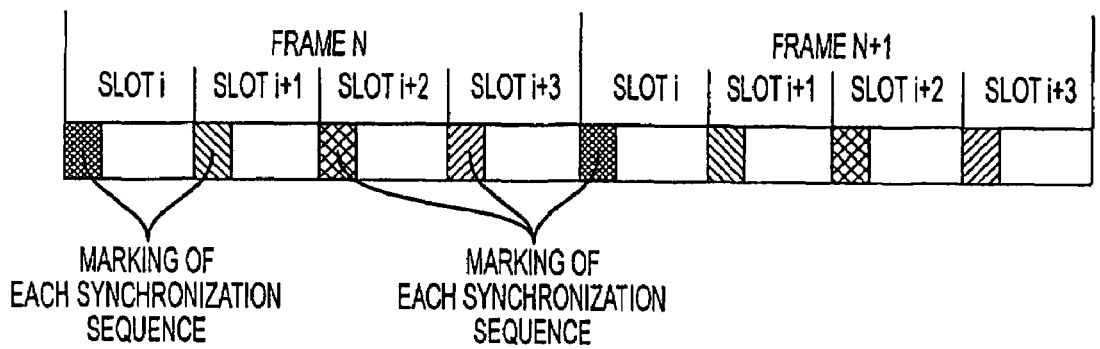
FIG. 3: shows a second example for marking the synchronization sequence for frame synchronization.

A simple possibility relates to, for example, using a different synchronization sequence for the first time slot as shown in Example 1 in FIG. 2. FIG. 2 shows the marking of the synchronization sequence for frame synchronization in Example 1. However, the relatively long duration of the detection of the start of the frame is disadvantageous in this method. In the least favorable case, it is necessary to wait for the complete frame duration until the corresponding sequence which defines the frame is repeated (assuming that provision has been made for at least one of the subscribers to generate a beacon in the first time slot). Example 2 in FIG. 3 shows a faster possibility for frame synchronization. FIG. 3 shows the marking of the synchronization sequence for frame synchronization in Example 2. Here the synchronization string is always dependent on the location in the frame, i.e. a specific synchronization string (or a set of specific synchronization strings) is assigned to each time slot. Therefore the time slot synchronization also inherently supplies the frame synchronization. However, the high numerical effort is disadvantageous in this case, since a separate correlator must be provided for each individual synchronization string.

Sequential Synchronization—Joint Synchronization:

The decentral synchronization is characterized in that the synchronization sequences can be sent from a plurality of mobile stations rather than from a single mobile station. In principle, the synchronization sequences of the different mobile stations can occupy a different or identical radio resource (which is determined by frequency band, time slot and/or code). A distinction is therefore made between two types of decentral synchronization in the context of this discussion:

Sequential Synchronization

Joint Synchronization

For clarification, it is relevant to explain a decentral synchronization for both modes on the basis of the frame structure for the UTRA-TDD mode (Low Chip Rate), the frame structure being defined by the 3GPP. This is outlined in FIG. 4 [3GPP TS 25.221 V4.1.0].

Figure 4:
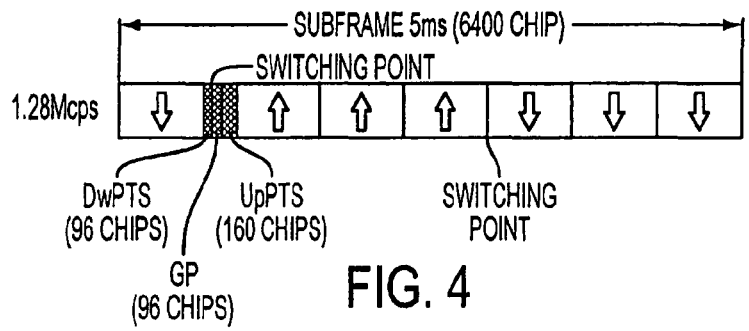
FIG. 4: shows a frame structure for the UTRA-TDD mode (Low Chip Rate), FIG. 5:—PartA an example of a sequential decentral synchronization, —Part B an example of a joint decentral synchronization.

The following must also be specified for FIG. 4:

Time slot#n (n from 0 to 6): the $n^{th}$ traffic time slot, 864 chips duration;

DwPTS: downlink pilot time slot, 96 chips duration;

UpPTS: uplink pilot time slot, 160 chips duration;

GP: main guard period for TDD operation, 96 chips duration;

The selected frame structure is also valid for TSM. Porting to the High Chip Rate variant of UTRA-TDD is possible without difficulty.

Sequential Synchronization:

The frame structure of UTRA-TDD has been optimized for operation in cellular networks. Minor modifications are required for operation in a self-organizing radio network. Inter alia, in order to solve the problem of power impairment, it is proposed that only one mobile station be allowed to start transmit operation within a time slot. The different codes, of which there are up to 16, are then used for the purpose of addressing different receive-mobiles. Since operation is continuously in a type of 'downlink mode', it is possible to dispense with different mid-ambles within a time slot, since each of the received mobiles is only concerned with the estimation of a single channel. On the basis of the correlation to the characteristic mid-amble of the relevant time slot, the timing of the relevant mobile can be determined in relation to the internal timing. The notification relating to the detected synchronization positions then specifies a degree for the extent to which the internal 'time slot pattern' must be adjusted. In order to reduce effort, it is possible to operate with the same mid-amble in all time slots. However, it is necessary to mark a slot especially for the frame synchronization, e.g. by identifying a special synchronization sequence for this slot. In this case, it must also be ensured that this slot is always used by a mobile station, since otherwise the frame synchronization cannot be maintained.

Joint Synchronization:

In this case, in addition to the actual data-carrying burst, some of the mobiles send the same synchronization sequence/beacon at the same time in a special time slot. This greatly simplifies the effort involved in the synchronization.

The frame synchronization is an implicit element of the algorithm.

Resource-intensive averaging for locating the internal Sync.Position is omitted. The averaging takes place to a certain extent on the transmission medium by virtue of the superimposition of the signals which carry the synchronization sequences.

Except for the fact that the mobile occasionally emits the Sync.Sequence itself, the synchronization mechanism is completely identical to the operation in the cellular case.

In the case of UTRA-TDD LCR, two special synchronization time slots are available. Both could be used effectively in the case of Joint Synchronization. One time slot is used for receiving the synchronization string of the surrounding mobiles, while the other is used for sending an internal synchronization string. All mobiles therefore transmit their synchronization string once in each frame and are able to synchronize with their environment once at the same time. In the case of the synchronization of a mobile to an already existing cluster, it would however be possible—as an exception to this rule—to operate both synchronization time slots in the receive mode. In order to distinguish between the synchronization time slots, a different synchronization sequence is assigned to the first and second time slot. Each mobile should allocate the transmission of its synchronization string to the time slot which has the lower received power, thereby ensuring an approximately uniform assignment of the mobiles to both time slots. In particular, the second active mobile is allocated to the unoccupied time slot when setting up the cluster.

Figure 5A:
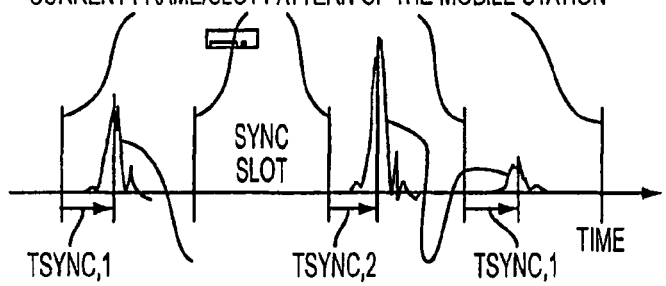
Figure 5B:
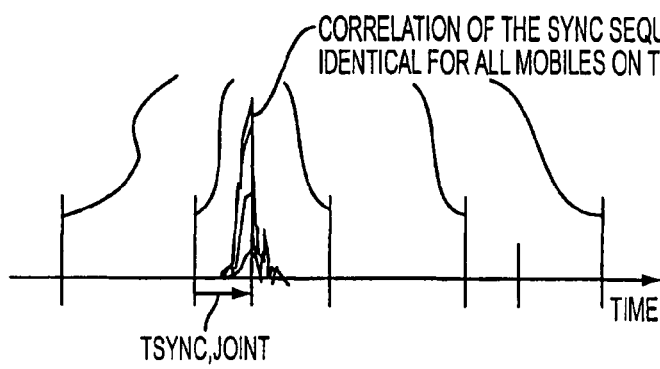

Reference is made to FIG. 5 for clarification of Sequential Decentral Synchronization and Joint Decentral Synchronization. The upper part FIG. 5A of FIG. 5 illustrates the Sequential Decentral Synchronization and the lower part FIG. 5B illustrates the Joint Decentral Synchronization.

The synchronization of asynchronous clusters/stations is considered below. The principle of the guard zone is applied in this case.

Figure 6:
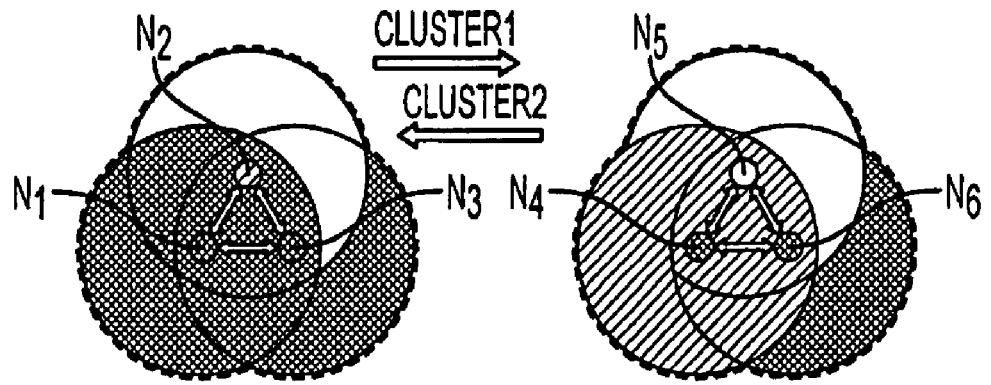
FIG. 6: shows an example of two asynchronous clusters.

FIG. 6 illustrates one of the essential challenges presented by the synchronization in mobile self-organizing networks. In this case, 2 clusters (each having 3 stations) are set up independently of each other and can be operated asynchronously in relation to each other due to their distance (both clusters lie outside of their reciprocal radio ranges). Without a reference, such as e.g. GPS or the base station of a mobile radio system, it is not possible to guarantee a synchronism of the two clusters. A method is described which achieves a 'local' balancing of the synchronization parameters—particularly in the case of clusters that 'merge'—before there is any exchange of data between the mobiles of the different clusters.

The solution which is indicated applies to self-organizing radio networks having a centrally organized synchronization, but is also independent thereof.

Radio Data Range and Synchronization Range:

The radio data range is defined in this case as the range within which a potential receiver is 'only just' able to guarantee a specified BER. The synchronization range is correspondingly defined as the range within which the correct detection of the synchronization parameters, such as e.g. the time slice, can be guaranteed with a specified probability by a potential receiver.

Guard Zone:

The synchronization range of a station should be greater than the resulting range of the payload data ("radio data range"). The overreach of the synchronization information in this case defines the so-called guard zone which can be used advantageously in order to achieve a local synchronism of specified system parameters before the data exchange between the stations of the same cluster is significantly disrupted by the transmissions of one or more stations of the approaching second cluster.

Figure 7:
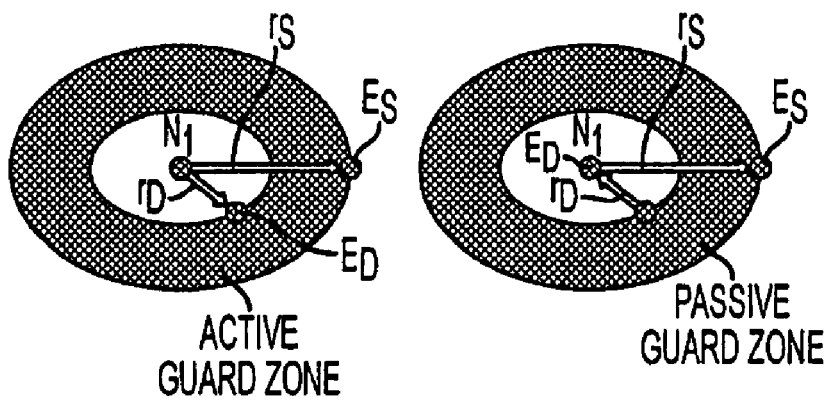
FIG. 7: shows an illustration of an active guard zone and a passive guard zone.

FIG. 7 illustrates the principle of an active guard zone on one side and a passive guard zone on the other side.

Depending on whether the referenced station functions as a sender or a receiver, the guard zone is the to be active or passive respectively. In the first case, the guard zone ensures that all stations within the radio data range receive the data which is sent by the station N1; in the second case, that all stations within the radio data range can deliver the data to the station N1 without the possibility of an asynchronously operating second cluster resulting in interference.

The objective of a greater synchronization range relative to the radio data range can be achieved technically by the following method (applied to the synchronization string):

greater send power (position required in a separate frequency band)

lower modulation index greater spreading factor when using band spreading techniques greater receiver sensitivity (optional) specification of a minimal required receive level for the data detection.

Illustration of the guard zone with reference to the example of UTRA TDD LCR:

The following explanations are intended to consider in greater detail the requirements relating to an active or passive guard zone for the case of a self-organizing network on the basis of UTRA TDD LCR. The following assumptions are made:

the send power S of all stations is the same (UE class 2: 250 mW: 24 dBm)

the send power of data burst and synchronization burst are the same the maximal spreading factor for the data is 16; the maximal spreading factor for the synchronization is 144 the signal-noise ratio (SNR) . . .

for a successful synchronization having a probability of 95% is $\delta_S=-7.0$ dB for the data detection $\delta_D$—a packet error rate of $<10^{-2}$ should be guaranteed—is maximally $\delta_D=7$ dB, thereby producing a ratio of $\Delta\delta=\delta_D-\delta_S=14$ dB.

the receiver sensitivity $E_{D0}$ for the data according to the standard is $E_{D0}=-105$ dBm.

The receiver sensitivity for the synchronization is $\Delta\delta$ more sensitive than $E_{D0}$ and is therefore $E_S=E_{D0}-\Delta\delta$.

In order to reduce the data range, the required receive level for the data detection $E_D$ can (optionally) be raised by $\epsilon_D>0$ dB, i.e. $E_D=E_{D0}+\epsilon_D=-105$ dBm+$\epsilon_D$. Two examples are shown below, in which the raising of the receive level is necessary in order to maintain the guard zone in the first example, and in which the raising of the level is forgone and therefore a greater range can be achieved in the second example.

The synchronization range is determined by the difference between send level and receiver sensitivity $E_s$, the Link Budget for the Sync. is therefore derived as $\xi_S=S-E_S=S-E_{D0}+\Delta\delta=129$ dB+$\Delta\delta$.

It applies correspondingly for the data range $\xi_D=S-E_D=S-E_{D0}-\epsilon_D=\xi_S-\Delta\delta-\epsilon_D=129$ dB-$\epsilon_D$.

Figure 8:
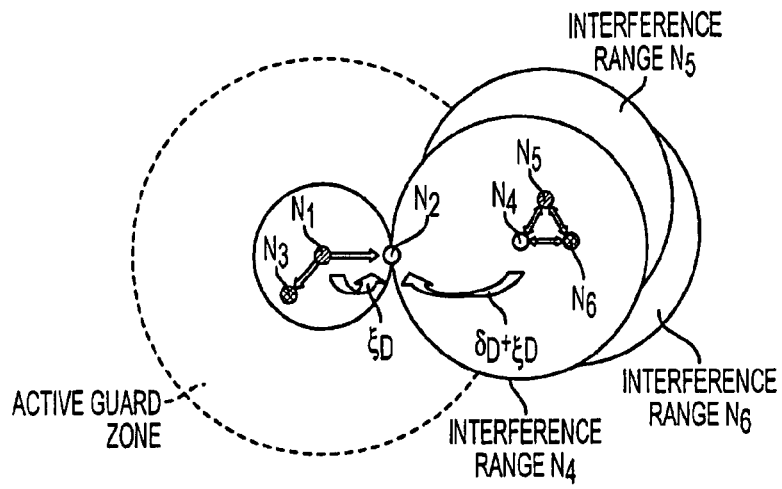
FIG. 8: shows an illustration of an active guard zone and the interference ranges for three mobile stations $N_4$, $N_5$ and $N_6$.

Reference is also made to the illustration in FIG. 8.

The requirements relating to an active guard zone are now briefly explained with reference to the above diagram. As a result of the transmission of a data burst by the station $N_1$, both the data range and—due to the concurrent emission of the mid-amble—the Sync. range and therefore the guard zone (for the station $N_1$) are determined. A station $N_2$ lies in the radio data range of $N_1$. The interference power of a potential noise source (station $N_4$) should be $\delta_D$ lower than the receive power of the data packet which is transmitted by the station $N_1$. The Path Loss between receive station $N_2$ and potential noise source $N_4$ should be $\delta_D+\xi_D$ accordingly. Due to the different propagation paths between $N_1$ and $N_2$ or between $N_4$ and $N_2$, the synchronization range must be at least $\xi_S=2\xi_D+\delta_D$. Therefore the necessary level for the data reception must be raised by $\epsilon_D=0.5$ $(S-E_{D0}+\delta_S)=61$ dB to $E_D=-44$ dBm. Assuming a free-space attenuation of $\rho/\text{dB}=32.44+20\log_{10}(r/\text{km})+20\log_{10}(f_C/\text{MHz})$ a data range of <50 m is produced.

Figure 9:
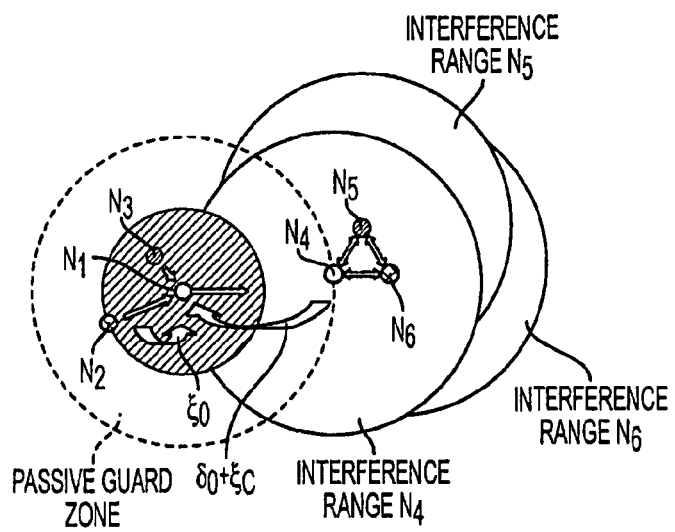
FIG. 9: shows an illustration of a passive guard zone for three mobile stations $N_4$, $N_5$ and $N_6$.

The illustration in FIG. 9 shows the following:

In contrast with the active guard zone, the passive guard zone does not protect the data reception of a third station which is situated within the data range of $N_1$, but instead guarantees that a data transmission of stations such as $N_2$, $N_3$ to $N_1$ is not significantly disrupted by the approaching second cluster comprising the nodes $N_4$, $N_5$, $N_6$. This greatly simplifies the requirements relating to the guard zone. In this case, the synchronization range need only guarantee a distance of $\xi_S=\xi_D+\delta_D$.

In terms of raising the receiver sensitivity to a minimal receive level for the data detection, it therefore applies that $\epsilon_D=\delta_S<0$ dB. A raising of the receiver sensitivity is therefore unnecessary. There remains a reserve of 7 dB. The achievable data ranges are clearly greater than 10 km.

The following statements apply in this context:

It is possible to achieve significantly greater ranges using a passive guard zone than can be achieved using an active guard zone.

The effort for the synchronization is significantly greater in the case of the passive guard zone. The passive guard zone must 'protect' a potential sender, and therefore the Sync sequence of the sender must be continuously/cyclically transmitted. This applies in principle for all stations of a cluster. By contrast, the active guard zone need only be set up for the relevant station shortly before the transmission. In order to ensure the efficient utilization of the radio resources, the passive guard zone should be combined with Joint Synchronization, in which case all mobiles of a cluster jointly occupy one resource only.

If different send powers are used when working, it is necessary either to switch to a separate frequency band for the transmission of the Sync. sequence (and operate there with the maximum send power) or take into consideration the difference between maximal and minimal send power in the power budget.

In mobile radio data networks, the merging of two clusters which have been independently synchronized and are therefore usually asynchronous places particularly high demands on the decentral synchronization. The synchronization range of a station should be greater than the resulting range of the payload data. The overreach of the synchronization information in this case defines the so-called guard zone, which can be used advantageously in order to achieve a local synchronism of specific system parameters before the exchange of data between the stations of the same cluster is significantly disrupted by the transmissions of one or more stations of the approaching second cluster. The objective of a greater synchronization range relative to the radio data range can be achieved technically by the following method (applied to the synchronization string):

greater send power lower modulation index greater spreading factor when using band spreading techniques greater receiver sensitivity (optional) specification of a minimal required receive level for the data detection.

A further embodiment is proposed in the following:

Decentral slot synchronization for self-organizing radio data networks on the basis of the slotted ALOHA method.

In a radio system according to the pure ALOHA method, each subscriber sends its data immediately after generation thereof in data packets of fixed length. Since the current occupancy of the radio channel is not checked before the transmission, collisions with the emissions of other subscribers can easily occur. Two data packets are lost if they collide, i.e. if they overlap even slightly in time.

A clear improvement in the number of successful transmissions can be achieved if the subscribers are only allowed to send at specific time points. This modification of the pure ALOHA method is called slotted ALOHA. In comparison with pure ALOHA, the time period in which two data packets can collide is halved for slotted ALOHA.

Figure 10:
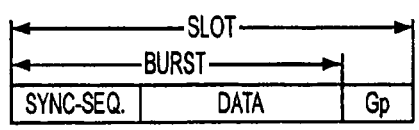
FIG. 10: shows a frame structure for the UTRA-TDD mode (Low Chip Rate).

In the case of slotted ALOHA, a burst which is transmitted within a time slot could have the structure that is shown in FIG. 10, for example. As well as the actual data sequence, the burst contains at least one additional sequence which is known to both the sender and the receiver and can be used for both the synchronization and the channel estimation.

Depending on the arrangement within the burst, the terms pre-amble or mid-amble are also used. The so-called Guard Period (GP) is used to compensate for runtime differences and reference clock tolerances of the subscribers. Use is normally made of signal spreading techniques for the synchronization. The decentral slot synchronization which is presented under Point 3 can therefore be used advantageously for the synchronization of the time slots.

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in Superguide v. DIRECTV, 69 USPQ2d 1865 (Fed. Cir. 2004).

The invention claimed is:

1. A method for synchronization of mobile stations in a radio communication system that is at least partly self-organizing and has mobile stations which are situated in reciprocal radio range via an air interface, comprising:
   transmitting synchronization sequences from at least some of the mobile stations;
   using the synchronization sequences from other mobile stations so that each mobile station can synchronize itself; and
   for at least one of the mobile stations, transmitting payload data with a range that is less than a range for synchronization sequences transmitted by the mobile station.

2. The method according to claim 1, wherein the synchronization sequences are part of a data packet which carries information.

3. The method according to claim 1, wherein the synchronization sequences are transmitted on a dedicated synchronization channel.

4. The method according to claim 1, wherein synchronization sequences are transmitted in the same burst which also carries the payload data.

5. The method according to claim 1, wherein the synchronization sequences are transmitted cyclically or periodically.

6. The method according to claim 1, wherein the mobile station uses the synchronization sequences to synchronize time slots.

7. The method according to claim 1, wherein only one mobile station starts a transmit operation within each time slot.

8. The method according to claim 1, wherein in order for a mobile station to synchronize itself, the mobile stations derives an internal synchronization position, the internal synchronization position being derived from synchronization positions detected from the other mobile stations.

9. The method according to claim 8, wherein when deriving the internal synchronization position, the mobile station takes into consideration a quality level of each of the detected synchronization positions and/or its preceding synchronization position.

10. The method according to claim 1, wherein the synchronization sequences are transmitted via bursts which are separate from payload data bursts.

11. The method according to claim 10, wherein the synchronization sequences are transmitted cyclically or periodically.

12. The method according to claim 11, wherein the mobile stations transmit a quality level of their synchronization together with the synchronization sequences in order to improve synchronization.

13. The method according to claim 12, wherein the synchronization sequences are transmitted via bursts which are separate from payload data bursts.

14. The method according to claim 13, wherein the mobile station uses the synchronization sequences to synchronize time slots.

15. The method according to claim 14, wherein only one mobile station starts a transmit operation within each time slot.

16. The method according to claim 1, wherein the mobile stations transmit a quality level of their synchronization together with the synchronization sequences in order to improve synchronization.

17. The method according to claim 16, wherein the synchronization sequences are transmitted via bursts which are separate from payload data bursts.

18. A mobile station for a radio communication system which is at least partly self-organizing, comprising:
   a transmitter to:
      send synchronization sequences with reference to which other mobile stations can synchronize themselves, and
      send payload data with a range that is less than a range for the synchronization sequences sent by the mobile station.

19. The mobile station according to claim 18, further comprising: a receiver to receive synchronization sequences from other mobile stations.

20. A radio communication system that is at least partly self-organizing, comprising:
   a plurality of mobile stations each having a transmitter to:
      send synchronization sequences with reference to which other mobile stations can synchronize themselves, and
      send payload data with a range that is less than a range for the synchronization sequences sent by the mobile station.

21. A method for synchronization of mobile stations in a radio communication system that is at least partly self-organizing and has mobile stations which are situated in reciprocal radio range via an air interface, comprising:
   transmitting synchronization sequences from at least some of the mobile stations;
   using the synchronization sequences from other mobile stations, such that each mobile station can synchronize itself; and
   for at least one of the mobile stations, transmitting payload data with a range that is less than a range for synchronization sequences transmitted by the mobile station, thereby defining a guard zone as the region in between the range of the payload data and the range of the synchronization sequences,
   wherein synchronization is performed without GPS.

* * * * *